US005213196A

United States Patent [19]

Wolf

[11] Patent Number: 5,213,196

[45] Date of Patent: May 25, 1993

[54] SUPPORT FRAME FOR A CONTINUOUS CONVEYOR INSTALLATION

[75] Inventor: Jacques M. E. Wolf, Paris, France

[73] Assignee: LTG Lufttechnische Gesellschaft mit beschränkter Haftung, Stuttgart, Fed. Rep. of Germany

[21] Appl. No.: 835,020

[22] Filed: Feb. 12, 1992

Related U.S. Application Data

[63] Continuation-in-part of Ser. No. 629,589, Dec. 18, 1990, abandoned.

[30] Foreign Application Priority Data

Dec. 18, 1989 [FR] France ................................ 89 16693

[51] Int. Cl.[5] ........................................... B65G 47/248

[52] U.S. Cl. ................................ 198/484.1; 271/188; 198/803.13

[58] Field of Search ........................ 198/803.13, 484.1; 271/188, 209, 315

[56] References Cited

U.S. PATENT DOCUMENTS

| | | | |
|---|---|---|---|
| 2,338,015 | 12/1943 | Whitaker | 198/803.13 |
| 2,561,397 | 7/1951 | May et al. | 198/803.13 |
| 2,755,906 | 7/1956 | Heywood | 198/484.1 X |
| 2,830,690 | 4/1958 | Macoy et al. | 198/484.1 X |
| 3,206,007 | 9/1965 | Philips | 198/803.13 |
| 3,605,992 | 9/1971 | Weber | 198/484.1 |
| 3,917,503 | 11/1975 | Tamura et al. | 198/484.1 X |
| 4,558,779 | 12/1985 | Schmitt et al. | 198/484.1 X |

FOREIGN PATENT DOCUMENTS

| | | | |
|---|---|---|---|
| 0233082 | 8/1959 | Australia | 198/484.1 |
| 0029083 | 3/1977 | Japan | 198/803.13 |
| 2065584 | 7/1981 | United Kingdom | 198/484.1 |

*Primary Examiner*—Robert P. Olszewski
*Assistant Examiner*—James R. Bidwell
*Attorney, Agent, or Firm*—Anderson Kill Olick & Oshinsky

[57] ABSTRACT

A support frame for continuous conveying installations for flat, thin and bendable objects used in drying tunnels of a tunnel for thermal treatment. The support frame has a shape which causes the object to be bent about an axis which is in a vertical plane extending in axial direction of the conveying installation. As a result, when the object is moved upwardly into an approximately vertical position prior to or during transport, the object is prevented from being deformed about an axis which extends approximately perpendicularly to the axial direction.

2 Claims, 5 Drawing Sheets

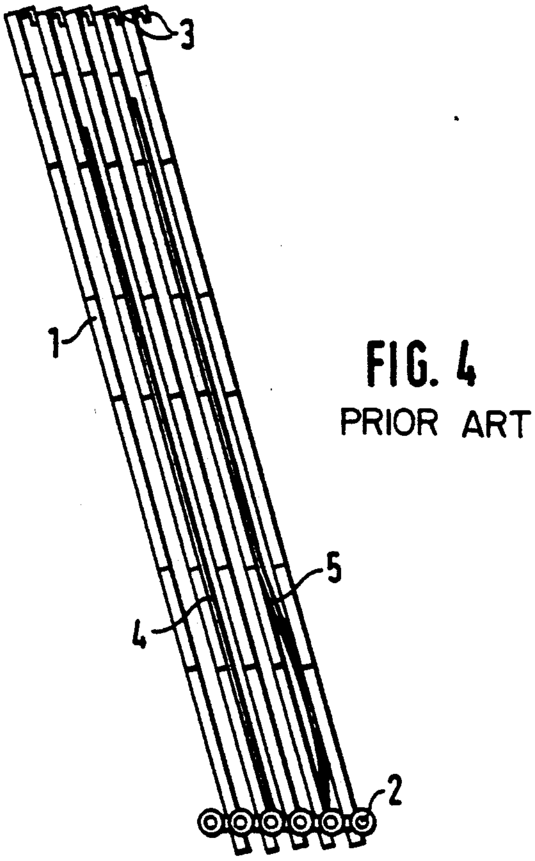
FIG. 4
PRIOR ART
FIG. 5
FIG. 6

FIG. 7
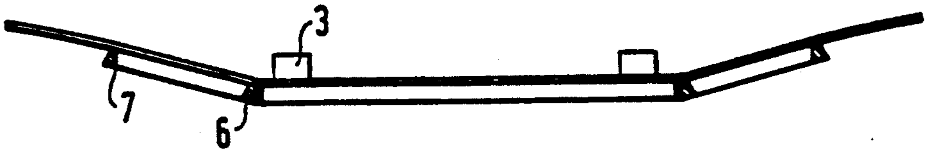
FIG. 8
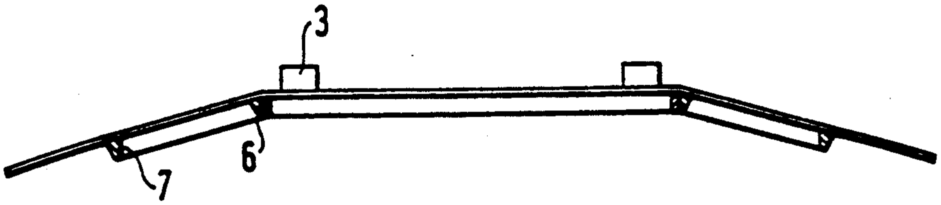
FIG. 10
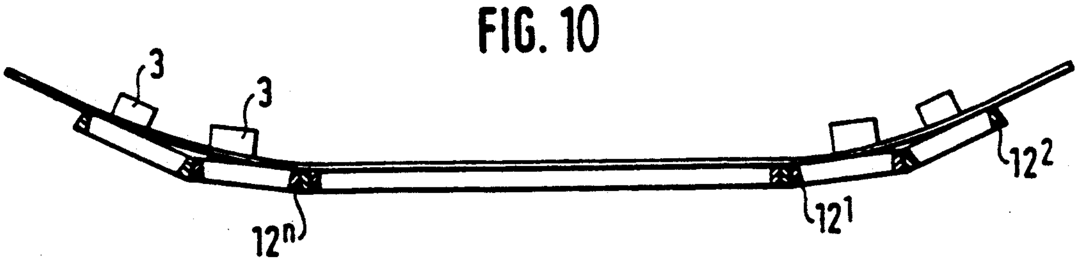
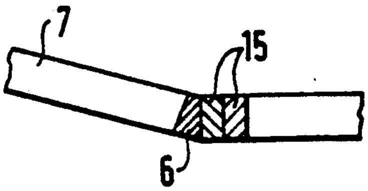
FIG. 9

SUPPORT FRAME FOR A CONTINUOUS CONVEYOR INSTALLATION

This is a continuation-in-part of Ser. No. 07/629,589, filed Dec. 18, 1990, now abandoned.

BACKGROUND OF THE INVENTION

1. Field of the Invention

The present invention relates to a support member or support frame, particularly wire frame, web frame or section frame, for preferably continuous conveying installations for flat, thin and bendable objects, such as plates or sheet metal, which have been provided with a fresh surface coating. The continuous conveying installation is provided, for example, in a drying tunnel or a tunnel for thermal treatment or a storage unit for the objects between two successive processes or the like.

2. Description of the Related Art

Wire frames of the above-described type are usually mounted in parallel arrangement one behind the other on one or more chains or similar devices. The plates or sheet metal pieces are continuously transported by means of the wire frames, so that the plates or sheet metal pieces can be conveyed through a tunnel for drying or thermal treatment or can be held in a waiting position between two successive work processes in the same production line.

Conveyor installations of this type are well known and are frequently used. FIG. 1 of the drawing schematically shows a typical example used in the metal packing industry. The metal packing industry requires thin iron sheets or aluminum plates which are varnished, imprinted or coated for protection or for optical reasons. For this purpose, it is necessary that the sheet plates dry or polymerize at temperatures of between 120° C. and 220° C. for approximately ten minutes in a tunnel b, so that the paint or the like securely adheres to the metal and can protect or ornament the plate. The purpose described above is only an example because the wire frames can also be used for supporting all types of flat and thin articles which are transported in an almost vertical position, wherein the time of treatment of the plates is determined by the length of the tunnel.

FIG. 1 of the drawing shows a plate or sheet metal coating unit a and a belt conveyor arrangement b for inserting the plates between the wire frames 1 of a continuous conveyor installation c. FIG. 1 also shows an unloading unit with belt conveyor arrangement d toward a stacking unit e.

FIG. 2 of the drawing shows in a top view a typical wire frame 1 with support extensions 7 for a conveyor installation for conveying metal plates through a drying tunnel. Additional support extensions, shown in broken lines, are provided if especially large metal plates are to conveyed.

FIG. 3 shows the same wire frame in section. FIG. 2 shows a sheet metal plate of maximum length and maximum width in broken lines.

The wire frame 1 is constructed in accordance with a compromise between two contradictory necessities. First, a large and robust support surface must be available which is suitable for a large number of different plate or sheet metal sizes, and a minimum mass must be provided, so that the energy requirement for repeatedly heating to processing temperature per hour is reduced. The wire frames usually are of welded or riveted flat section steel, as shown in FIG. 2. On the other hand, it has been customary until today to insert the two surfaces between two parallel planes, so that they can be aligned without problems on a rolling plate if they have buckled or been deformed as a result of a problem during transport (FIG. 3).

The wire frames are installed on one or more chains 2, as shown in FIG. 4. The wire frames are mounted on the chain or chains such that the angle between the vertical and the plane of placement of the wire frames is approximately 15°, so that the plates being transported rest on the wire frames in a defined manner on that surface which is opposite the side which has just been imprinted or coated, i.e., on the back side, so that the front side does not come into contact with the preceding wire frame. In conveyor systems of sound construction, U-shaped parts 3 fastened at the top to the wire frames serve as transverse connections between two successive wire frames. The resulting cage-like arrangement ensures that the wire frames which are moved in a row are practically non-deformable.

Wire frames of the above-described construction have in the past been entirely satisfactory as long as the lengths and heights (dimensions of the almost vertical plate during transport) had a relationship relative to the thickness which ensured that the plates did not bend under their own weight and remained resting against the wire frames essentially plane, as can be seen in FIG. 4, reference numeral 4.

In order to utilize metal more effectively, there is the tendency to increase the size of each plate and to reduce the thickness thereof. In conventional conveyor installations, large and thin plates are easily bent, as indicated in FIG. 4 by reference numeral 5, so that undesirable contacts between the plates and the rear sides of the preceding wire frames occurred more frequently. The contact results in insufficient protection and/or undesirable spots which make the plates essentially useless. The described tendency can also be found in plates of light metal which is less stiff than steel.

SUMMARY OF THE INVENTION

It is the object of the present invention to provide a support member or support frame of the above-described type in which the disadvantages described above are eliminated.

In accordance with the present invention, the support member or support frame which receives the article to be conveyed initially in an almost horizontal position has a surface which is shaped in such a way that the article received on the support member is being bent as a result of gravity downwardly about an axis which is in the vertical plane, preferably median plane, particularly longitudinal plane or longitudinal median plane, of the conveyor installation, so that, when the article is moved upwardly into an approximately vertical position prior to or during transport, it is prevented that the article is deformed about an axis which extends approximately perpendicularly to the plane described above.

Thus, the invention is based on the finding that a large force must be applied in order to bend a flat article which is of a material which is resistant in two perpendicular directions. In fact, the plate looses its deformability when it is deformed in different directions and, thus, a high force is required. Accordingly, in order to prevent that the plate is being bent about a horizontal axis, as illustrated in FIG. 4, reference numeral 5, it is sufficient to bend the plate about a perpendicular axis before it is moved into an almost vertical position in which in known devices there is the danger of undesirable deformation. Bending of the article is achieved in a simple manner by the support member according to the present invention.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 4 is a partial sectional view, on a larger scale, of the conveyor installation of FIG. 1, showing support members mounted on chains of the conveyor installation;

FIG. 5 to FIG. 8 are sectional views of various embodiments of the support member according to the present invention;

FIG. 9 is a sectional view of a detail of another embodiment of the support member according to the present invention;

FIG. 10 is a sectional view, on a larger scale, of yet another embodiment of the support member of the present invention.

DETAILED DESCRIPTION OF THE PREFERRED EMBODIMENT

The simplest embodiment of the support member, i.e., wire frame, web frame, section frame, according to the present invention is a wire frame which is bent into the shape of a section of a cylinder, as shown in FIG. 5. The wire frame may also be bent into an open V-shape, as shown in FIG. 6. When the plate is placed on the support member in an essentially horizontal position, the plate is bent about an axis h shown in FIG. 1 which extends in a vertical plane g shown in FIG. 11; The wire frames according to the present invention may also have lateral extensions which are directed upwardly, as shown in FIG. 7, or directed downwardly as shown in FIG. 8.

In the three embodiments shown in FIGS. 5–7, the wire frame bends the plate being transported in such a way that the side portions travel ahead of the center of the plate during transport in vertical or almost vertical position. The opposite is true in the case of the embodiment in FIG. 8. Thus, the wire frames may bend the plates in either direction. Both directions are within the scope of the present invention.

In order to facilitate the manufacture of the wire frames according to FIGS. 7 and 8 with conventional tools, the flat steel sections 6 having rectangular cross-sections, which serve to provide the lateral support extensions or arms 7, can be replaced by trapezoid-shaped sections. A section of this type is illustrated in FIG. 9. When the wire frame is produced, the lateral support extensions 7 automatically form the desired V-shaped angle of approximately 180° relative to the center portion of the wire frame.

Figure 1:
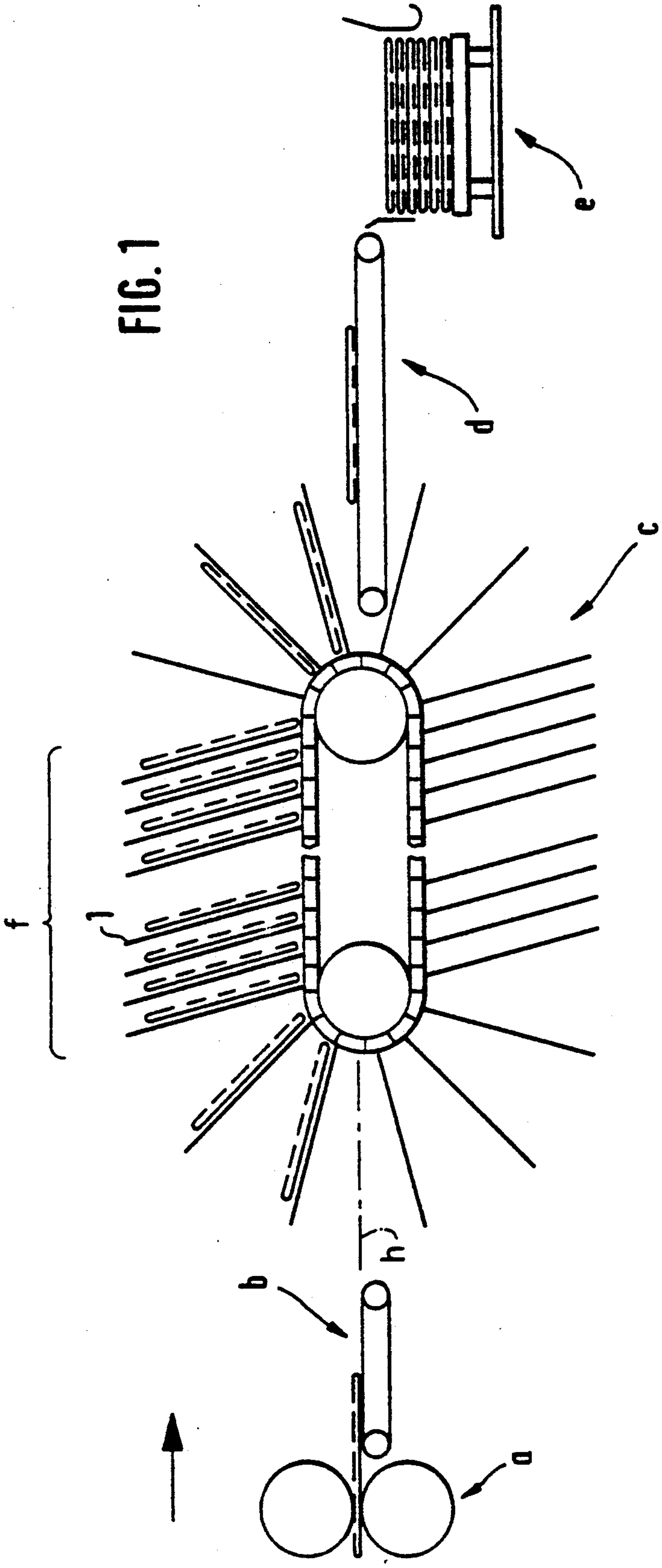
FIG. 1 is a schematic sectional view of a continuous conveyor installation.
Figure 2:
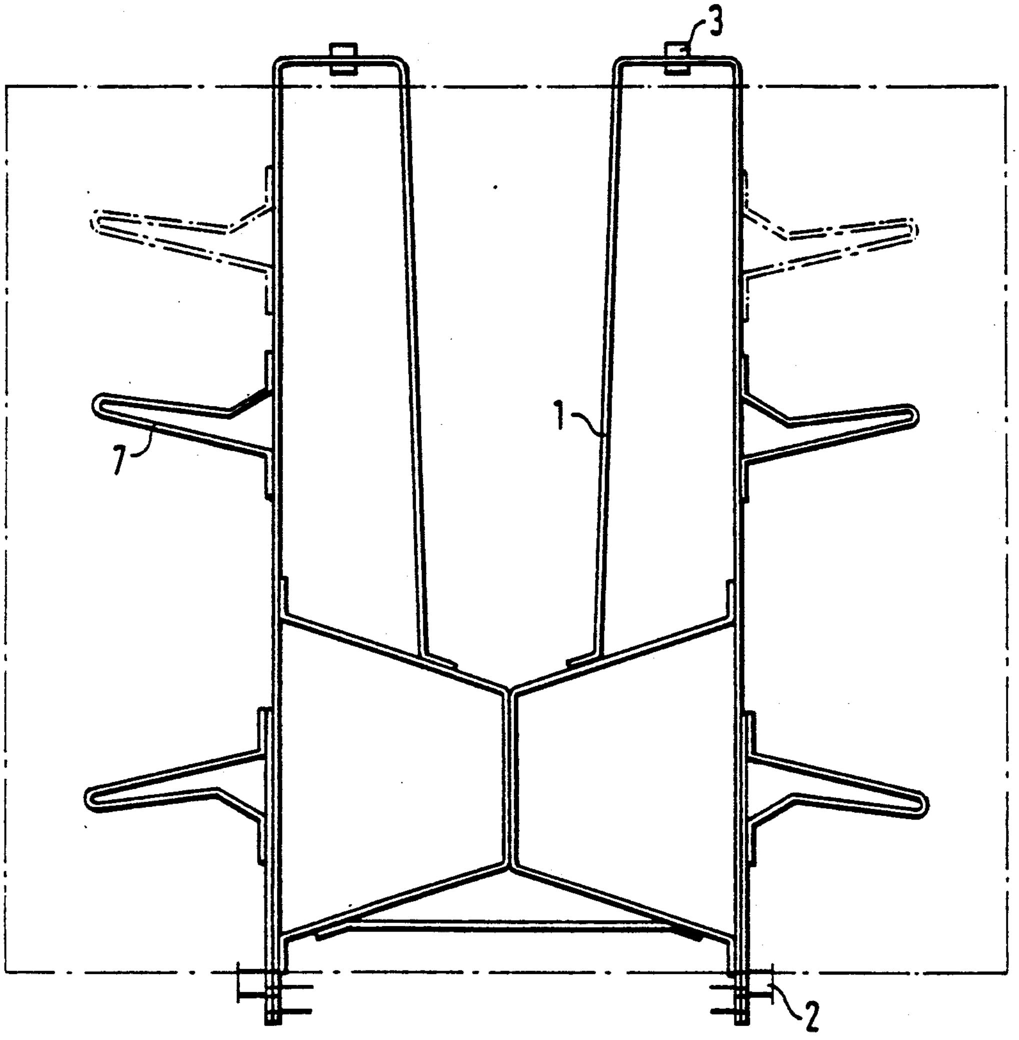
FIG. 2 PRIOR ART
FIG. 2 is a top view, on a larger scale, of a support member of the conveyor installation of FIG. 1.
Figure 3:
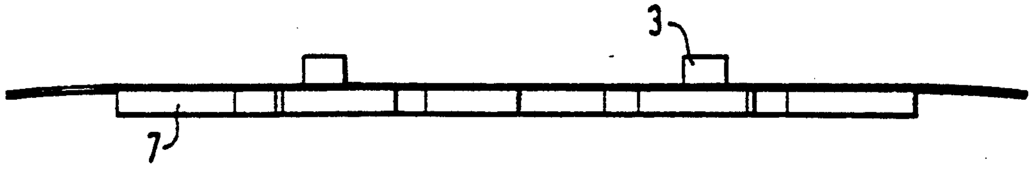
FIG. 3 PRIOR ART
FIG. 3 is a sectional view of the support member of FIG. 2.

If it is not possible to construct the plate supply or belt conveyor arrangement b of FIG. 1 in such a way that the size of the plates are lifted before they are inserted between two wire frames, and if the wire frames are provided with raised side portions, i.e., if they have shapes as shown in FIGS. 5, 6 or 7, the construction of the wire frame as shown in FIG. 2 is no longer suitable for automatically loading "toothed" plates which have zig-zag edges as illustrated in broken lines in the left-hand portion of FIG. 12, reference numeral 8. The cutouts at the edges of these plates are used with increasing frequency in the metal processing industry in order to reduce the metal losses which are caused by a straight cut if the objects to be manufactured are arranged in groups of five on the surface of the plates in order to be varnished or imprinted. The objects generally are round, such as lids, can bottoms, or closures, which are manufactured in large quantities and whose material costs have a significance influence on the production cost.

The wire frame shown in FIG. 2 does not meet these requirements because, when the plates are automatically loaded, when the plates perform a translatory movement along the axis of the wire frame, there is the danger that the edges 9 of the toothed plates 8 collide with the lateral support extensions 7 whose outer ends are raised above the center portion of the plate.

Figure 11:
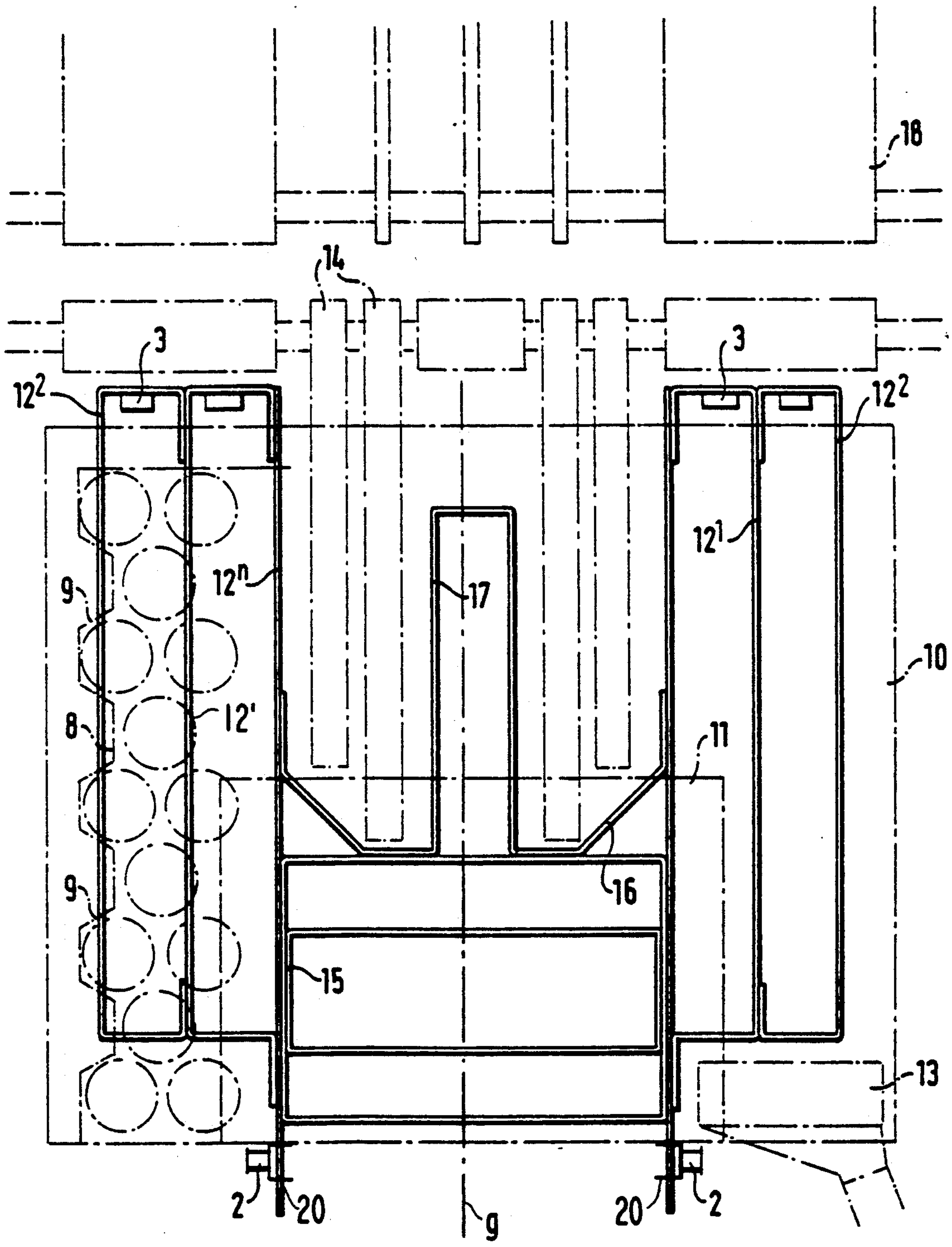
FIG. 11 is a schematic top view of the embodiment of the support member shown in FIG. 10.

FIGS. 10 and 11 of the drawing show a wire frame which eliminates this disadvantage.

In the wire frame shown in FIGS. 10 and 11, the toothed edges are supported by straight and continuous sections $\mathbf{12}^1$ and $\mathbf{12}^2$ which extend parallel to the plane of symmetry of the wire frame and which are bent at the outer portions thereof, so that rectangular frames are created which are welded or riveted to the central portion 15. The structure is reinforced by means of stiffening members 16.

In accordance with a preferred embodiment, the straight sections $\mathbf{12}^1$ and $\mathbf{12}^2$ have almost trapeze-shaped cross-sections so that an angled surface is automatically obtained when the wire frame is assembled, as can be seen in the sectional view of FIG. 10. The section 15 and the stiffening members 16 are still made of flat steel with rectangular cross-section.

FIG. 11 of the drawing shows a wire frame which has two lateral frame sections $\mathbf{12}^1$ and $\mathbf{12}^2$ on both sides. The number of frame sections can be reduced or increased without departing from the scope of the invention. An increase of the frame sections $\mathbf{12}^1$, $\mathbf{12}^2$, $\mathbf{12}^n$ has the result that it is possible to better support the sides of a greater number of different large plates. However, the increased material of the wire frame requires an increased energy consumption when heating the frames during treatment.

Also within the scope of the present invention are frame sections $\mathbf{12}^1$, $\mathbf{12}^n$ with rectangular cross-section with the frame sections extending along an uninterrupted length parallel to the plane of symmetry of the wire frame.

FIG. 10 of the drawing shows that when the sections 12 have a trapezoid-shaped cross-section, each connection $\mathbf{12}^1$-$\mathbf{12}^2$, $\mathbf{12}^2$-$\mathbf{12}^n$ forms a new part with inclined angles, so that the desired curvature of the plate is increased.

The automatic closing arrangement includes devices which decelerate and stop each plate introduced into the conveyor arrangement b shown in FIG. 1. The unloading arrangements d shown in FIG. 1 are provided with belts for removing the plates. The belts are frequently supported by magnetic or other rollers. The wire frame must have a shape which avoids obstructions in its path.

The wire frame according to the present invention has all the requirements for avoiding these obstructions.

The sections or outer longitudinal frame portions 12$^2$ or 12$^n$ do not extend over the entire height of the wire frame in order to facilitate mounting of a magnetic or pneumatic plate decelerating unit 13 which is illustrated only schematically in the lower right-hand portion of FIG. 11.

In addition, a large arc-shaped recess between the sections 12$^1$ facilitate movement of the wire frame past horizontal belts and the corresponding magnetic and pneumatic rollers. These rollers serve to pull out the plates which are pressed downwardly by the movement of the wire frames at the end of the conveying installation 18 and to move the plates to a conveyor unit 18, corresponding to reference character d of FIG. 1.

Moreover, a central stirrup 17 is fastened to a frame 15 in such a way that it extends between two groups of removal belts 14. The stirrup 17 prevents high and narrow plates which have been curved by the shape of the wire frames from sliding through between the sections 12$^1$.

The U-shaped members which serve as transverse connections between successive wire frames are fastened to sides of the sections 12$^1$, 12$^2$, 12$^n$ which extend perpendicularly to the axis of the conveying installation, as can be seen in FIG. 11.

Each wire frame or section frame or web frame is connected to the chain 2 by means of two webs 20 which extend beyond the sides of the frame 15. These webs 20 extend into the openings of the chain members. The wire frames are fastened in the classical manner by means of slit pins.

Each wire frame represents two planes of symmetry before the U-shaped members 3 are attached. Thus, each wire frame can be used without difference either in a conveying installation in which the center of the bent plates faces forwardly or in a conveying installation in which the center of the bent plates faces rearwardly. The manner in which the transverse connecting pieces or U-shaped members 3 are connected exclusively determines the manner in which the conveying installation operates.

The wire frames are particularly intended for conveying installations used in drying tunnels which are part of imprinting and varnishing plants for plates of metal which are used, for example, for the manufacture of packings, such as, cans, sheet metal containers, barrels, etc., bottle closures such as caps, or various other articles of metal which are manufactured in large numbers, such as, plates, toys, games, etc.

While specific embodiments of the invention have been shown and described in detail to illustrate the inventive principles, it will be understood that the invention may be embodied otherwise without departing from such principles.

I claim:

1. A support member for a continuous conveying installation for conveying plate-shaped and bendable objects, the conveying installation having a longitudinal axis, the conveying installation receiving the plate-shaped objects with each plate-shaped object and the support member being in an essentially horizontal position and conveying the plate-shaped objects in direction of the longitudinal axis in an upright position, the support member defining a surface, the surface of the support member being shaped such that, when the support member is in an essentially horizontal position, a plate-shaped object placed on the surface of the support member is bent downwardly due to gravity about an axis located in a vertical plane extending in direction of the longitudinal axis of the conveying installation, whereby, when the plate-shaped object is moved into the upright position prior to and during conveyance, the plate-shaped object is prevented from being bent about an axis which extends approximately perpendicularly to the vertical plane extending in axial direction of the conveying installation; the support member comprising a plurality of shaped metal wires which are connected to each other, the metal wires being arranged in two planes, the metal wires of the two planes being connected to each other by means of trapezoidal sections, so that the surface of the support member has a bent shape for bending the plate-shaped objects.

2. A support member for a continuous conveying installation for conveying plate-shaped and bendable objects, the conveying installation having a longitudinal axis, the conveying installation receiving the plate-shaped objects with each plate-shaped object and the support member being in an essentially horizontal position and conveying the plate-shaped objects in direction of the longitudinal axis in an upright position, the support member defining a surface, the surface of the support member being shaped such that, when the support member is in an essentially horizontal position, a plate-shaped object placed on the surface of the support member is bent downwardly due to gravity about an axis located in a vertical plane extending in direction of the longitudinal axis of the conveying installation, whereby, when the plate-shaped object is moved into the upright position prior to and during conveyance, the plate-shaped object is prevented from being bent about an axis which extends approximately perpendicularly to the vertical plane extending in axial direction of the conveying installation; the support member comprising a plurality of shaped metal wires which are connected to each other, the metal wires being arranged in two planes, the metal wires of the two planes being connected to each other by means of trapezoidal sections, so that the surface of the support member has a angled shape for bending the plate-shaped objects.

* * * * *